US008891023B2

(12) United States Patent
Hasegawa et al.

(10) Patent No.: US 8,891,023 B2
(45) Date of Patent: Nov. 18, 2014

(54) DISPLAY DEVICE AND RADIO TRANSMISSION CONTROL METHOD

(75) Inventors: Naoki Hasegawa, Kanagawa (JP); Yoshinori Ota, Kanagawa (JP); Kaoru Kamiyama, Tokyo (JP); Masanobu Kimoto, Kanagawa (JP); Hiroshige Hayakawa, Kanagawa (JP); Hideyuki Yoshimura, Tokyo (JP); Masayuki Miyamoto, Saitama (JP); Takeshi Ono, Saitama (JP); Atsuro Hirakawa, Tokyo (JP); Mari Sasaki, Aichi (JP); Akihiro Shironouchi, Chiba (JP); Kazuya Shimomura, Tokyo (JP); Yuji Anami, Kanagawa (JP); Masato Hirose, Aichi (JP)

(73) Assignee: Sony Corporation, Tokyo (JP)

( * ) Notice: Subject to any disclaimer, the term of this patent is extended or adjusted under 35 U.S.C. 154(b) by 979 days.

(21) Appl. No.: 12/561,538

(22) Filed: Sep. 17, 2009

(65) Prior Publication Data

US 2010/0097530 A1    Apr. 22, 2010

(30) Foreign Application Priority Data

Oct. 21, 2008    (JP) ................................. 2008-270495

(51) Int. Cl.
*H04N 5/44* (2011.01)
*H04N 21/442* (2011.01)
(Continued)

(52) U.S. Cl.
CPC ....... *H04N 5/4401* (2013.01); *H04N 21/44227* (2013.01); *H04N 5/765* (2013.01);
(Continued)

(58) Field of Classification Search
USPC ............ 348/734, 731, 725, 553, 569; 725/81, 725/123
See application file for complete search history.

(56) References Cited

U.S. PATENT DOCUMENTS

| 6,292,283 B1 * | 9/2001 | Grandbois ..................... 398/107 |
| 2003/0072257 A1 | 4/2003 | Ikedo et al. |

(Continued)

FOREIGN PATENT DOCUMENTS

| EP | 1 439 666 A1 | 7/2004 |
| EP | 1 617 596 A1 | 1/2006 |

(Continued)

OTHER PUBLICATIONS

European Search Report issued Oct. 7, 2011, in Patent Application No. 09173633.0.

(Continued)

*Primary Examiner* — Jeffrey Harold
*Assistant Examiner* — Omer Khalid
(74) *Attorney, Agent, or Firm* — Oblon, Spivak, McClelland, Maier & Neustadt, L.L.P.

(57) ABSTRACT

A display device includes: a monitor and receiving set having a video signal receiving section, a display section, an image quality control section, a first control signal transceiver, and a first control section; and a control and transmission set having a television broadcast receiving section, a video signal input section, a video signal transmitting section, a second control signal transceiver, a key input section, and a second control section. The Power consumption of a first radio transmission path formed by the video signal transmitting section and the video signal receiving section is larger than that of a second radio transmission path formed by the first and second control signal transceivers. A control signal for a user interface is communicated by the first and second control signal transceivers. Only the second radio transmission path of the first and second radio transmission paths is communicable in a standby state.

18 Claims, 6 Drawing Sheets

(51) Int. Cl.
*H04N 5/765* (2006.01)
*H04N 21/4363* (2011.01)
*H04N 21/443* (2011.01)
*G08C 17/02* (2006.01)

(52) U.S. Cl.
CPC ........... *H04N 21/43637* (2013.01); *Y02B 60/50* (2013.01); *H04N 21/4436* (2013.01); *G08C 17/02* (2013.01)
USPC ........... 348/734; 348/553; 348/569; 348/725; 725/81; 725/123

(56) References Cited

U.S. PATENT DOCUMENTS

| | | | |
|---|---|---|---|
| 2004/0143622 A1 | 7/2004 | Hirabayashi et al. | |
| 2005/0013437 A1* | 1/2005 | Ikonen et al. | 380/241 |
| 2005/0166241 A1 | 7/2005 | Kim et al. | |
| 2006/0285149 A1* | 12/2006 | Dei | 358/1.15 |
| 2007/0060152 A1 | 3/2007 | Sakamoto | |
| 2007/0090968 A1* | 4/2007 | Nakamura | 340/825.72 |
| 2007/0127408 A1 | 6/2007 | Sakamoto | |
| 2008/0095104 A1 | 4/2008 | Hansen | |
| 2009/0115768 A1 | 5/2009 | Hattori | |

FOREIGN PATENT DOCUMENTS

| | | |
|---|---|---|
| EP | 1 617 648 A1 | 1/2006 |
| EP | 1 914 941 A2 | 4/2008 |
| EP | 2 003 874 A2 | 12/2008 |
| JP | 9-121335 | 5/1997 |
| JP | 2002-198957 | 7/2002 |
| JP | 2003-304412 | 10/2003 |
| JP | 2004-343725 | 12/2004 |
| JP | 2005-303678 | 10/2005 |
| JP | 2007-274440 | 10/2007 |

OTHER PUBLICATIONS

Communication Pursuant to Article 94(3) EPC issued Oct. 19, 2011, in European Patent Application No. 09173633.0.
Partial European Search Report issued Jul. 7, 2011, in Patent Application No. 09173633.0.
Office Action issued Aug. 3, 2010 in JP Application No. 2008-270495.

* cited by examiner

DISPLAY DEVICE AND RADIO TRANSMISSION CONTROL METHOD

BACKGROUND OF THE INVENTION

1. Field of the Invention

The present invention relates to a display device and a radio transmission control method applicable to a television display device which can be mounted on a wall, for example.

2. Description of the Related Art

In recent years, it has become possible to mount video display panels, such as liquid crystal display panels and organic EL (electroluminescent) panels, on a house wall as the panels become thin and light. However, it spoils the appearance given that the cable extrudes from the wall-mounted display panel. This is a cause of restriction on where the installation takes place. It has already become practical to transmit a video signal and the like necessary to a display panel without using a cable.

Radio transmission of the video signal is performed by using a wireless LAN with a relatively high transmission rate. The wireless LAN, IEEE (Institute of Electrical and Electronics Engineers) 802.11b, in which a 2.4 GHz band is used and the transmission rate is 11 Mbps, and IEEE 802.11a, in which a 5 GHz band is used and the transmission rate is 54 Mbps, are known. For example, Japanese Unexamined Patent Application Publication No. 2003-304412 discloses the technique of transmitting a signal by radio transmission using the 5 GHz band when a digital television signal to be wirelessly transmitted is a high-definition signal and of transmitting a signal by radio transmission using the 2.4 GHz band when the digital television signal to be wirelessly transmitted is a standard-definition signal.

SUMMARY OF THE INVENTION

Since it is preferable for a display panel to be light, the main body which performs processing other than display, such as reception and decoding of a television broadcast signal, is provided separately. The following problems occur when video and audio data and control data are transmitted between the display panel and the main body through one radio transmission path.

In order to link the power ON of the display panel to the power ON of the main body or to link the power ON of the main body to the power ON of the display panel, it is necessary to supply the power consistently to a wireless module for transmission and reception of the video and audio data. As a result, the standby power is the power consumption of the module at its lowest. In addition, the module is a circuit which is formed by a plurality of IC circuits and which realizes a wireless (transmission or reception) function. In general, when transmitting the video and audio data by wireless using a 5 GHz band, the radio frequency is high and the data transmission rate is high. For this reason, since the power consumption of the module is high, the standby power of the entire system is increased.

In addition, since it is necessary to transmit and receive the video and audio data in large quantities, the amount of data which can be transmitted and received for the control is limited. In a recent television receiver, various kinds of settings, switching of an input signal, selection of a broadcast channel, and the like are performed by GUI (Graphical User Interface) using a screen of the display panel. When the video and audio data and the control data are transmitted through one radio transmission path, it becomes difficult to realize such kinds of GUI because the amount of control data is large. For example, a problem may occur such as the reaction time for the user's operation becoming lengthy.

In view of the above, it is desirable to provide a display device and a radio transmission control method for solving the above-described problem which occurs when there is only one radio transmission path between a display panel and a main body.

According to an embodiment of the present invention, there is provided a display device including: a monitor and receiving set having a video signal receiving section that receives a video signal by wireless, a display section that displays the received video signal from the video signal receiving section, an image quality control section that controls the image quality of an image displayed on the display section, a first control signal transceiver that transmits and receives a control signal by wireless, and a first control section that controls power ON/OFF and the image quality control section; and a control and transmission set having a television broadcast receiving section, a video signal input section for inputting a plurality of video signals, a video signal transmitting section that transmits by wireless to the video signal receiving section a video signal from either the television broadcast receiving section or the video signal input section, a second control signal transceiver that transmits a control signal to the first control signal transceiver and receives a control signal from the first control signal transceiver, a key input section, and a second control section that controls power ON/OFF, user interface using a screen of the display section, reception processing of the television broadcast receiving section, and input selection processing of the video signal input section. The power consumption of a first radio transmission path formed by the video signal transmitting section and the video signal receiving section is larger than that of a second radio transmission path formed by the first and second control signal transceivers. A control signal for the user interface is communicated by the first and second control signal transceivers. Only the second radio transmission path of the first and second radio transmission paths is communicable in a standby state.

According to another embodiment of the present invention, there is provided a radio transmission control method including the steps of: mounting an application of a user interface, which uses screen display of a display device provided in a monitor and receiving set, in a control and transmission set which is connected to the monitor and receiving set through first and second radio transmission paths; transmitting a video signal from the control and transmission set to the monitor and receiving set through the first radio transmission path; and transmitting a control signal, which is generated by key input of the control and transmission set, to the monitor and receiving set through the second radio transmission path to thereby perform an operation of the user interface.

According to the embodiment of the present invention, since only a wireless module for transmission and reception of a control signal in which the power consumption is low is in a standby state, the power consumption in a standby state can be reduced. In the embodiment of the present invention, a control signal for user interface is transmitted through the second radio transmission path different from the first radio transmission path for transmission of a video signal. Accordingly, even if the amount of data of the control signal is large, the control signal can be transmitted without any problem. In addition, the problem of a delay in the response to the user's operation does not occur. When it is difficult to perform the communication through the first radio transmission path, a radio communication channel can be newly set by an operation of the user interface of the monitor and receiving set.

DESCRIPTION OF THE PREFERRED EMBODIMENTS

Hereinafter, the best mode (hereinafter, referred to as an embodiment) for performing the invention will be described. Moreover, the embodiment described below is the preferred and specific example of the present invention and various technically preferable limitations are given. In the following description, however, the scope of the present invention is not limited to the embodiment as long as there is no particular statement of limitation of the present invention.

Embodiment

Outline of a System

Figure 1:
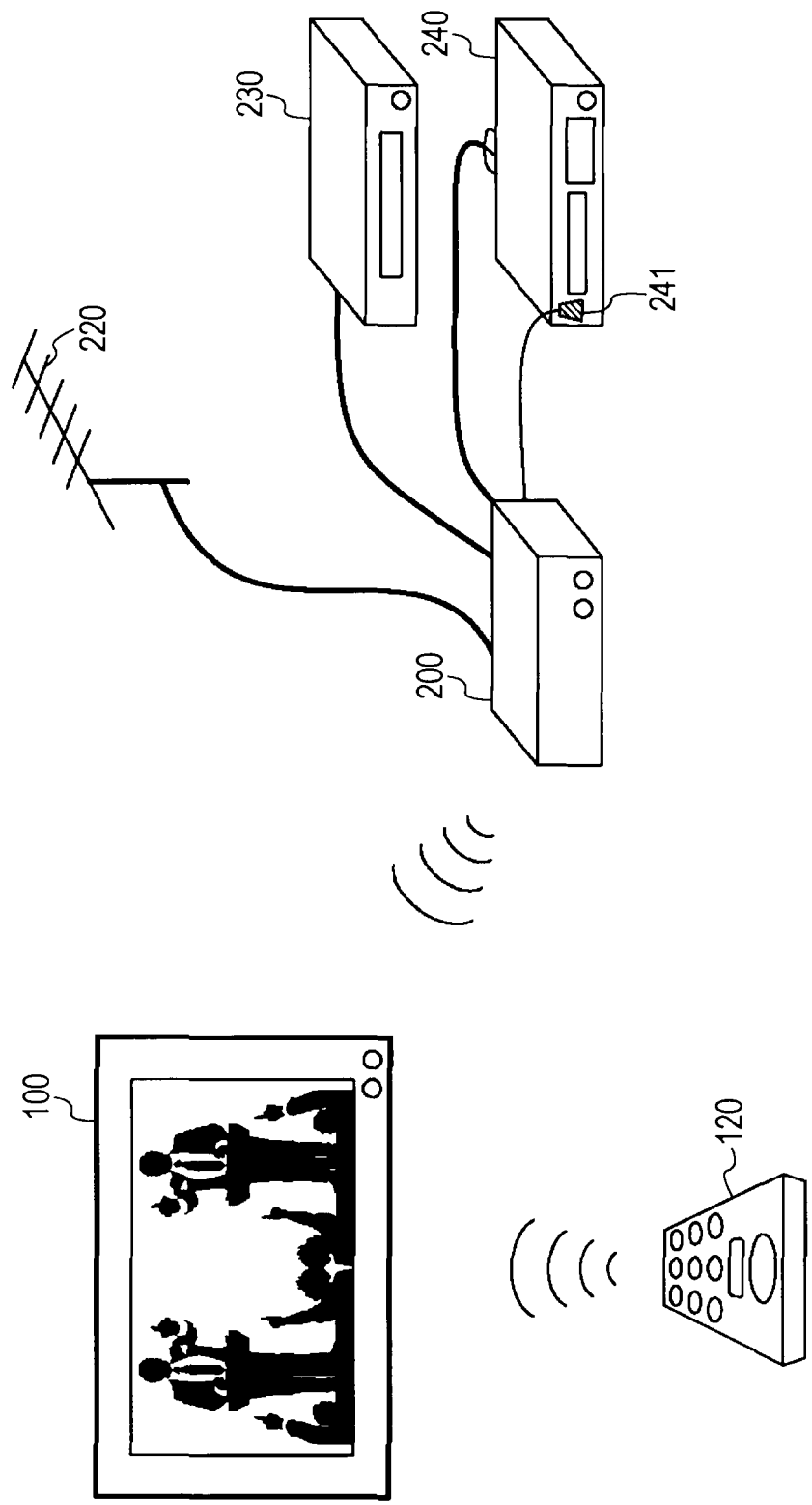
FIG. 1 is a block diagram illustrating the schematic configuration of a system according to an embodiment of the present invention.

An embodiment includes a monitor and receiving set 100 mounted on the wall of a house, for example, and a control and transmission set 200 connected to the monitor and receiving set 100 through the first and second radio transmission paths, as shown in FIG. 1. The monitor and receiving set 100 is called a media monitor 100 in the following explanation. The control and transmission set 200 is called a media box 200 in the following explanation.

The media box 200 does not have to be installed in the same room as the media monitor 100, and may be installed in an arbitrary location if it is within the reaching distance of control information through the radio transmission. A remote control signal is transmitted from a remote control commander (hereinafter, simply referred to as a commander) 120 to the media monitor 100. The remote control signal is transmitted through a 2.4 GHz band radio transmission path.

A television antenna 220 is connected to the media box 200, so that the media box 200 can receive a television broadcast. A BD (Blu-ray Disc) recorder 230 as an external video signal source is connected to the media box 200 through an HDMI (High-definition multimedia interface). Digital video and audio signals and a digital control signal are transmitted through the HDMI.

Moreover, a DVD (Digital Versatile Disc) player 240 is connected to the media box 200. An analog video signal from the DVD player 240 is supplied to the media box 200. In order that the media box 200 can operate the DVD player 240 by remote control, an Ir (Infrared) blaster (also referred to as an AV mouse) 241 is attached to the DVD player 240.

<Remote Control System>

Figure 2A:
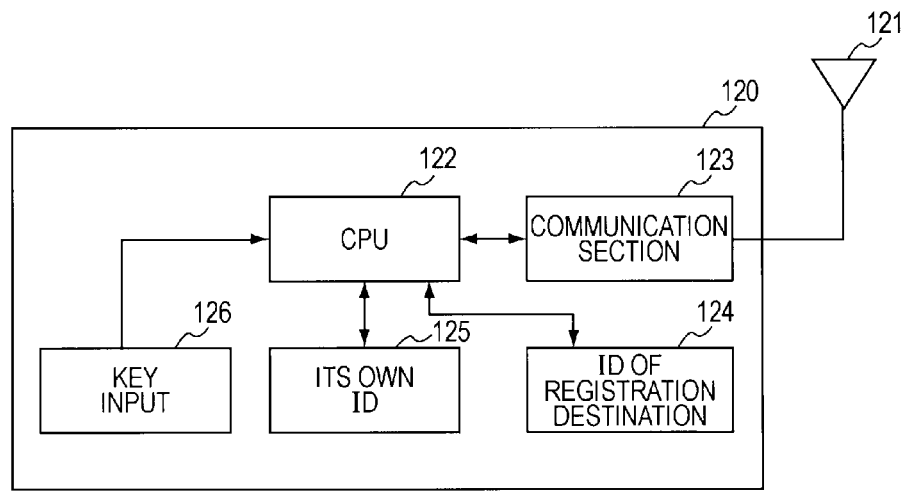
FIGS. 2A and 2B are block diagrams illustrating examples of the configurations of the transmission module and the receiving module of a remote controller in the embodiment of the present invention.

As shown in FIG. 2A, the commander 120 includes an antenna 121 for transmitting and receiving a radio wave, a microprocessor (hereinafter, referred to as a CPU (Central Processing Unit)) 122 as a control section that operates programs corresponding to a communication function, read and write operations on storage media, and various kinds of key input, a communication section 123 for radio communications, a storage medium 124 which stores the identification information ID of a pairing partner, a storage medium 125 which stores its own ID, and a key input section 126 with keys. The storage media 124 and 125 are formed by nonvolatile writable memories, for example. The CPU 122 includes a ROM (Read Only Memory), a RAM (Random Access Memory), and the like and performs overall control of the respective sections of the commander 120 by executing the program stored in the ROM and the like.

As the identification information, for example, EUI-64 (64-bit Extended Unique Identifier) which is the same ID as a MAC address may be used. The identification information is used as information on the transmission source and transmission destination at the time of the pairing operation and the normal communication operation. The EUI-64 is a 64-bit identification information assigned to the interface of a communication device. The commander 120 is supplied together with the media monitor 100 and serves as an exclusive remote controller for the media monitor 100.

Figure 2B:
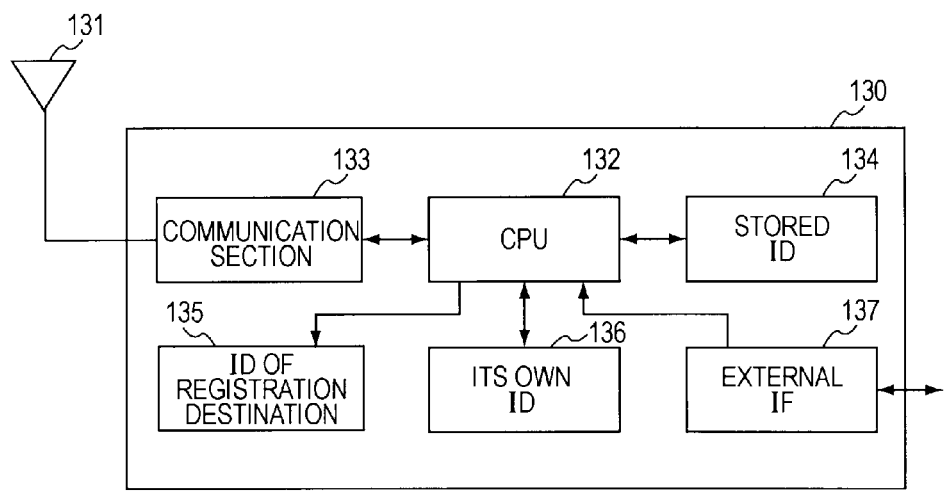

A receiving set (hereinafter, appropriately referred to as a receiving module) 130 of a remote control system is provided in the media monitor 100. As shown in FIG. 2B, the receiving module 130 includes an antenna 131 for transmitting and receiving a radio wave, a CPU 132 which operates programs corresponding to a communication function, read and write operations on storage media, and various kinds of key input, a communication section 133 for radio communications, a storage medium 136 which stores its own ID, for example, the EUI-64, and an external interface 137 for interface with a control section of the media monitor 100. The CPU 132 performs overall control of the respective sections of the receiving module 130.

In addition, the receiving module 130 includes a storage medium 134 in which an ID of the pairing partner (remote controller to be connected) 120, for example, a unique ID (EUI-64) is written beforehand. Moreover, in the case of a configuration where a unique ID of another remote controller can be stored, the media monitor 100 may be operated by another remote controller. The storage media 134, 135, and 136 are formed by nonvolatile memories, for example.

The communication section 123 of the commander 120 and the communication section 133 of the receiving module 130 perform two-way communication on the basis of a predetermined radio communication method. In addition, each of the communication section 123 of the commander 120 and the communication section 133 of the receiving module 130 may have a function of outputting a command, which has been received by wireless remote control, to the control section of the media monitor 100 to which the external interface 137 is connected.

The communication section 123 of the commander 120 and the communication section 133 of the receiving module 130 can perform two-way communication on the basis of the same radio communication method. As the radio communication method, for example, the physical layer of IEEE 802.15.4 may be used. The IEEE 802.15.4 is the name of the short-range wireless network standards called the PAN (Personal Area Network) or WPAN (Wireless PAN).

The communication rate in the standards is several tens of kbps to several hundreds of kbps. The communication range is several tens of meters to several hundreds of meters. In addition, communication is performed in the unit of a frame. One frame has a size of maximum 133 bytes including the payload (0 to 127 bytes) and a header (6 bytes). In this communication method, a number of methods may be adopted as transmission and reception methods. In the case of the remote control system such as the present embodiment, the simplest method, that is, a method in which a command is transmitted from the commander 120 to the receiving module 130 and the commander 120 receives the reply from the receiving module 130, is adopted. The communication standards of the remote control system are 2.4 GHz band radio communication standards.

<Explanation of Each Section of the System>

Figure 3:
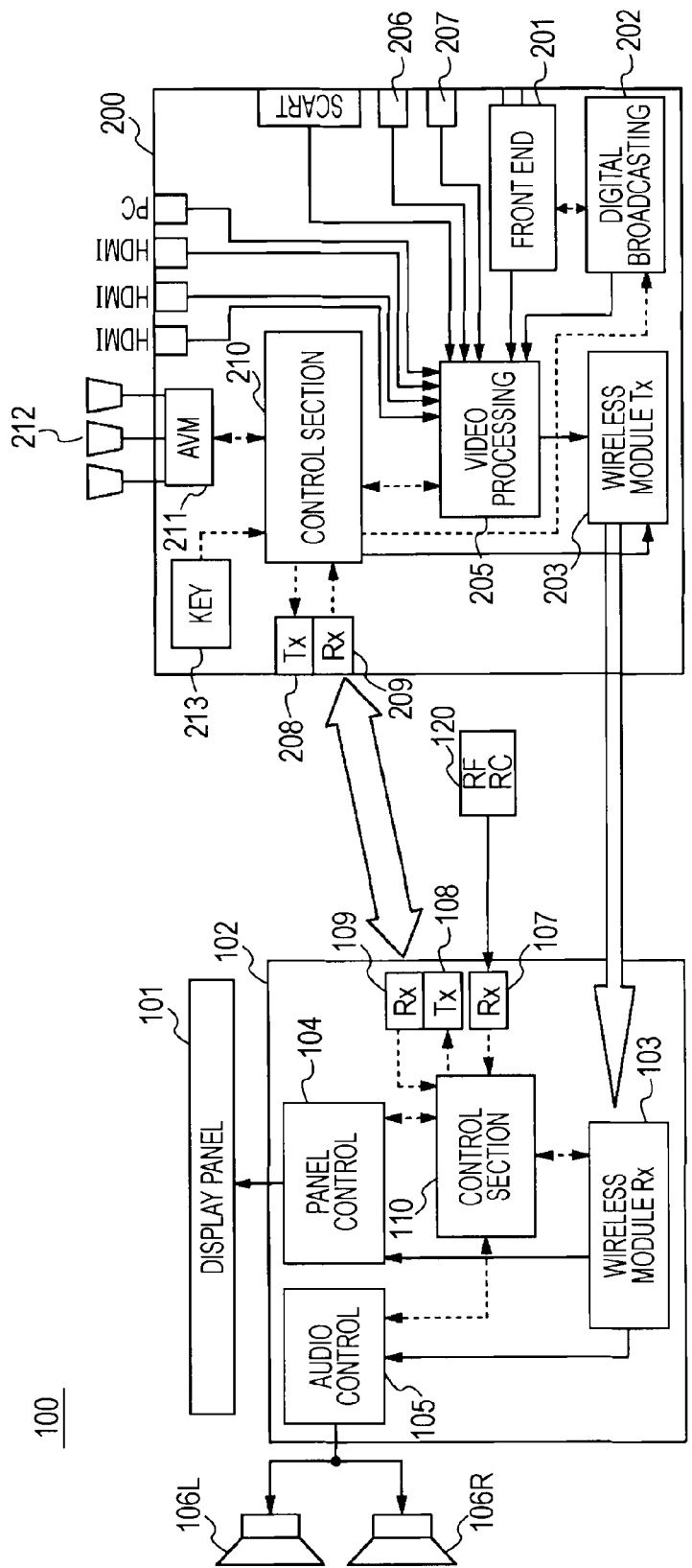
FIG. 3 is a block diagram illustrating the embodiment of the present invention.

As shown in FIG. 3, the media monitor 100 has a display panel 101, such as a liquid crystal panel, and a reception and control device 102. In FIG. 3, a signal path indicated by a solid line is a transmission path of video and audio signals, and a signal path indicated by a dotted line is a transmission path of a control signal. The reception and control device 102 has a wireless module 103 for signal reception. The wireless module 103 for signal reception receives the video and audio signals from a wireless module 203 for signal transmission of the media box 200. The wireless modules 103 and 203 also transmit the video and audio signals in the standards based on a wireless LAN of IEEE 802.11a in which the 5 GHz band is used and the transmission rate is 54 Mbps, for example. The first radio transmission path is formed by the wireless modules 103 and 203. Clock information synchronizing with the video and audio signals is also transmitted through the first radio transmission path.

For example, a transceiver IC (WHD; Wireless High-definition Interface (trademark)) which can realize data transmission of 1.5 Gbits/second by using a frequency channel of 18 MHz in a 5 GHz band and can transmit an uncompressed HD (high-definition) television signal of 1080i/720p has already been put to practical use. However, the present invention is not limited to the above transmission method, and a transmission method in which a 60 GHz band is used, a UWB (Ultra wideband) method, and the like may also be used.

The digital video signal received by the wireless module 103 is supplied to the display panel 101 through a panel control section 104 and is then displayed on the display panel 101. The digital audio signal received by the wireless module 103 is supplied to an audio control section 105 and is then reproduced in stereo by speakers 106L and 106R.

The remote control signal from the commander 120 is received by a receiving module 107. The received remote control signal is supplied to a control section 110. The receiving module 107 has the configuration shown in FIG. 2B. As a signal format corresponding to the command, for example, the same format as the existing infrared remote controller is used. For example, the control section 110 is a microcomputer including a CPU, a ROM, a RAM, and the like and performs overall control of the respective sections by executing a program stored in the ROM and the like.

The commander 120 has a power ON/OFF key, a channel switching key, a volume adjustment key, an input video signal switching key, a menu key for displaying a home menu, a movement key for moving a cursor on the home menu, a decision key for deciding the selection using the cursor, and the like similar to the commander for a normal television receiver.

Some of the home menus are as follows.

Setting menu: setting of image quality setting menu, sound quality setting menu, and screen mode, external input and output setting, HDMI setting, and the like are performed.

Channel selection menu: switching between analog broadcasting, digital broadcasting, and satellite broadcasting is performed.

External input switching menu: selection of video and audio devices that are connected is performed.

When the home menu key of the commander 120 is pressed, icons for the items in the home menu described above are displayed in a row on the screen of the display panel 101. The desired icon is selected by operating the horizontal movement key. For example, an icon in the setting menu is selected. Icons corresponding to a plurality of settings (image quality setting, sound quality setting, and the like) are displayed in the vertical direction crossing the icon of the setting menu. Such GUI is known as XMB (cross media bar: registered trademark).

Then, for example, the image quality setting is selected by operating the vertical movement key. An icon for each item of the image quality setting is displayed beside the icon of the image quality setting menu. For example, icons, such as image quality mode, picture, brightness, and concentration of color, are displayed. The icon that the user wants to set is selected by the horizontal movement key, and the set contents are selected by the vertical movement key.

In the sound quality setting, treble adjustment, bass adjustment, balance adjustment, and the like are performed in the same way as the image quality adjustment described above. Thus, various kinds of setting may be performed by an operation of the arrow keys provided in the commander 120. Application of the GUI is mounted in the media box 200, and the commander 120 functions as an input device which decides the selection by moving the cursor. A signal corresponding to the input operation of GUI is transmitted to the media box 200. In addition, a remote control signal based on the operation of the power ON/OFF button of the media monitor 100, a remote control signal based on the operation of the channel selection button, and a remote control signal based on the operation of the volume adjustment button are signals generated in operations other than the input operation of GUI. A remote control signal related to the control of the media monitor 100, which is a remote control signal other than operation of GUI, does not have to be supplied to the media monitor 100. However, it may be transmitted to the media monitor 100.

The remote control signal based on the operation (operation on the GUI, channel switching operation, and the like) of the commander 120 described above is received by the receiving module 107 of the media monitor 100, and the remote control signal is supplied to the control section 110. Since control of GUI is made on the side of the media box 200, the control section 110 transmits the received remote control signal to the media box 200 and receives the control command from the media box 200. That is, the control section 110 performs image quality setting and sound quality setting on the basis of the GUI operation and the corresponding control command. The image quality setting is performed by the panel control section 104. The sound quality setting and the volume adjustment are performed by the audio control section 105. For the volume adjustment, this is directly controlled corresponding to the operation of the volume adjustment of the commander 120 without the GUI operation.

The image quality setting, sound quality setting, and volume adjustment are monitor side control items. Adjustments to the channel selection menu, external input switching menu, and the like other than the monitor side control items are executed by the control in the media box 200. Control items other than the monitor side control items are main body side control items.

The control section 110 which has received the remote control signal transmits the command of the remote control signal to the media box 200, and the media monitor 100 receives the command regarding the monitor side control items generated in the media box 200. A transmission module 108 and a receiving module 109 are provided in the media monitor 100.

The transmission module 108 and the receiving module 109 form a second radio transmission path through which two-way communication is performed between a transmission module 208 and a receiving module 209 provided in the media box 200. For the second radio transmission path, the standards of the same IEEE 802.15.4 as in the above-described remote control system which uses a 2.4 GHz band may be used. By using different identifiers, a radio transmission path for remote control and a radio transmission path for control signal transmission and reception may exist together. In addition to the above standards, the standards of IEEE 802.11b, in which a 2.4 GHz band is used and the transmission rate is 11 Mbps, may be used. In both operation and standby states, the power consumption of the second radio transmission path is less than that of the first radio transmission path (wireless modules 103 and 203) for transmitting the video and audio signals. The data necessary for GUI is transmitted from the media box 200 to the media monitor 100 through the second radio transmission path.

A front end 201 for receiving the television broadcast is provided in the media box 200. A signal received through the television antenna 220 is supplied to the front end 201. The front end 201 includes a tuner for selecting the television broadcast channel. In connection with the front end 201, a digital broadcasting section 202 is provided. The channel selection operation is controlled by the digital broadcasting section 202, such that decoding and the like of the received television signal are performed. The video and audio signals of the received television broadcast program are supplied to a video and audio (AV) processing section 205. The channel selection operation performed by the digital broadcasting section 202 is controlled by a control section 210. For example, the control section 210 is a microcomputer including a CPU, a ROM, a RAM, and the like and performs overall control of the respective sections by executing a program stored in the ROM and the like.

The video and audio signals from external devices (BD recorder 230 and DVD player 240) are supplied to the video and audio processing section 205. A plurality of HDMI terminals, a terminal to which a personal computer (expressed as a PC) is connected, a SCART (Syndicart des Constructeurs d'Appareils) terminal, analog signal input terminals 206 and 207, and the like are provided as terminals to which the external devices are connected. The SCART terminal is a connection terminal capable of transmitting a video signal and an audio signal collectively.

The video and audio processing section 205 supplies video and audio signals, which are selected from the video and audio signals of the received television broadcast program and the video and audio signals from the external devices, to the wireless module 203. The wireless module 203 transmits the video and audio signals to the wireless module 103 of the media monitor 100 by wireless without compression using the 5 GHz band. Switching of the signals performed by the video and audio processing section is controlled by the control section 210.

The control section 210 supplies to the transmission module 208 the control signal to be transmitted and receives a control signal from the receiving module 209. The control section 210 controls an Ir blaster control section 211 to thereby control a plurality of Ir blasters 212. In addition, the media box 200 has a mechanical key 213, and a key signal from the key 213 is supplied to the control section 210.

Figure 4:
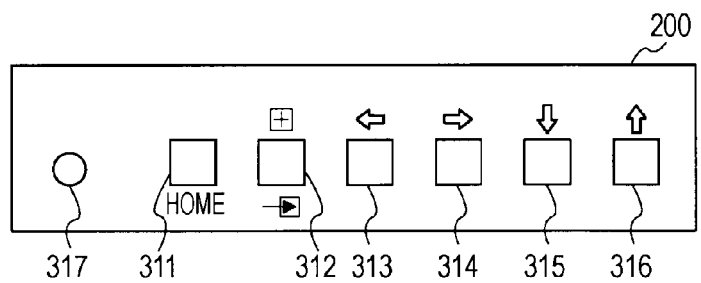
FIG. 4 is a diagram schematically illustrating an example of the keys provided in a media box.

As the key 213, the media box 200 has a plurality of buttons 311 to 316 and a power button 317 on an operation panel of the case, as shown in FIG. 4. The button 311 is a home menu display button. The button 312 is an input switching button and a decision button. The button 313 is a volume down and cursor movement key (left direction). The button 314 is a volume up and cursor movement key (right direction). The button 315 is a channel down and cursor movement key (lower direction). The button 316 is a channel up and cursor movement key (upper direction). The same control as the commander 120 for remote control may be performed by using the buttons 311 to 317 of the main body.

The control section 210 of the media box 200 controls the GUI by controlling the power source of the media box 200. In addition, the control section 210 executes the main body side control items of the above-described home menu other than the monitor side control items performed by the media monitor 100. For example, the front end 201 and the digital broadcasting section 202 are controlled by the control section 210, such that a desired television broadcast program can be selected.

<Processing at the Time of Button Operation>

Figure 5:
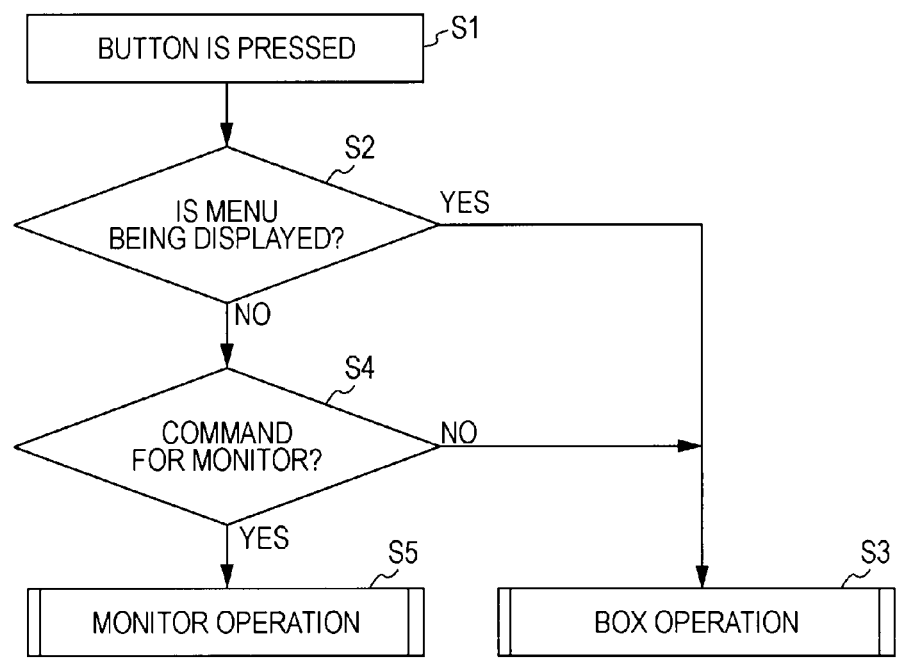
FIG. 5 is a flow chart explaining the processing when a key of the media box is pressed in the embodiment of the present invention.

The processing when the above buttons of the media box 200 are pressed will be described with reference to the flow chart in FIG. 5. In step S1, a button is pressed. In step S2, it is determined whether or not the menu is being displayed. When the menu is being displayed, it is determined that the button has been pressed for the cursor control of the user interface, and an operation signal is used for the GUI control of the main body (media box) (step S3).

When it is determined that the menu is not displayed in step S2, a command is transmitted to the media monitor 100 through the second radio transmission path. The media monitor 100 determines whether or not the command is a command of the monitor side control item, for example, an image quality adjustment command in step S4. When it is determined to be the monitor side command, it is used to control the media monitor (step S5).

When it is determined not to be the command for the monitor in step S4, the media monitor 100 transmits the command to the media box 200 through the second radio transmission path. The media box 200 treats the command as a channel switching command of the media box 200, for example.

As described above, the button attached to the media box 200 has a function for volume adjustment and channel switching and also has a function as a cursor movement key or a decision key at the time of display of the home menu of GUI. When the user presses the key, it is necessary to determine whether the key is effective for user interface or effective for channel switching and volume adjustment. This determination may be performed by making the media monitor 100 and the media box 200 notify their states to each other. In this case, it is difficult to make a correct determination when the notification has failed. In one embodiment of the present invention, an operation using a key becomes possible by transmitting only the information on the pressed button and making each of the media monitor 100 and the media box 200 use only its own state as determination material, as described above.

<Processing Between Media Box and Media Monitor>

Figure 6:
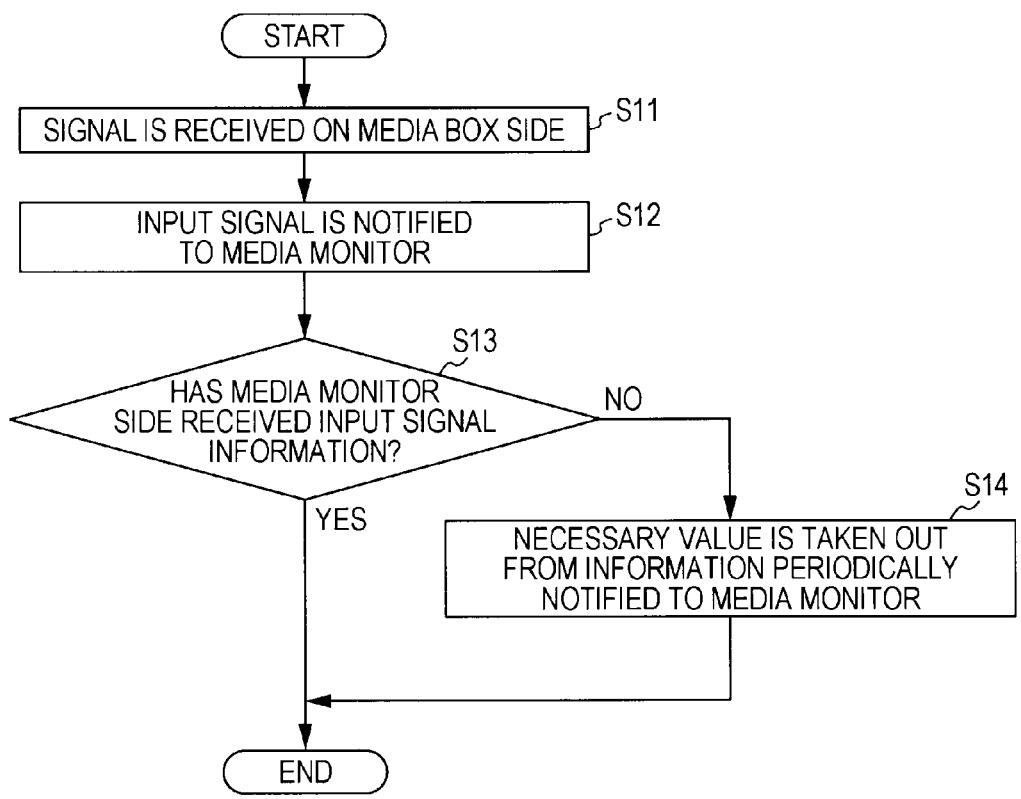
FIG. 6 is a flow chart for explaining the processing when input signal information is transmitted from the media box to a media monitor in the embodiment of the present invention.

FIG. 6 shows a specific example of the transmission of a control signal performed through the second radio transmission path. In step S11, the media box 200 side receives a signal. In step S12, an input signal is notified to the media monitor 100. In step S13, it is determined whether or not the media monitor 100 side has received the input signal information.

When it is determined that the media monitor 100 has received the input signal information, the process ends. When it is determined that the media monitor 100 could not receive the input signal information in step S13, a necessary value is taken out from the information periodically notified to the media monitor 100 in step S14. The information which is periodically notified is the minimum necessary information.

Figure 7:
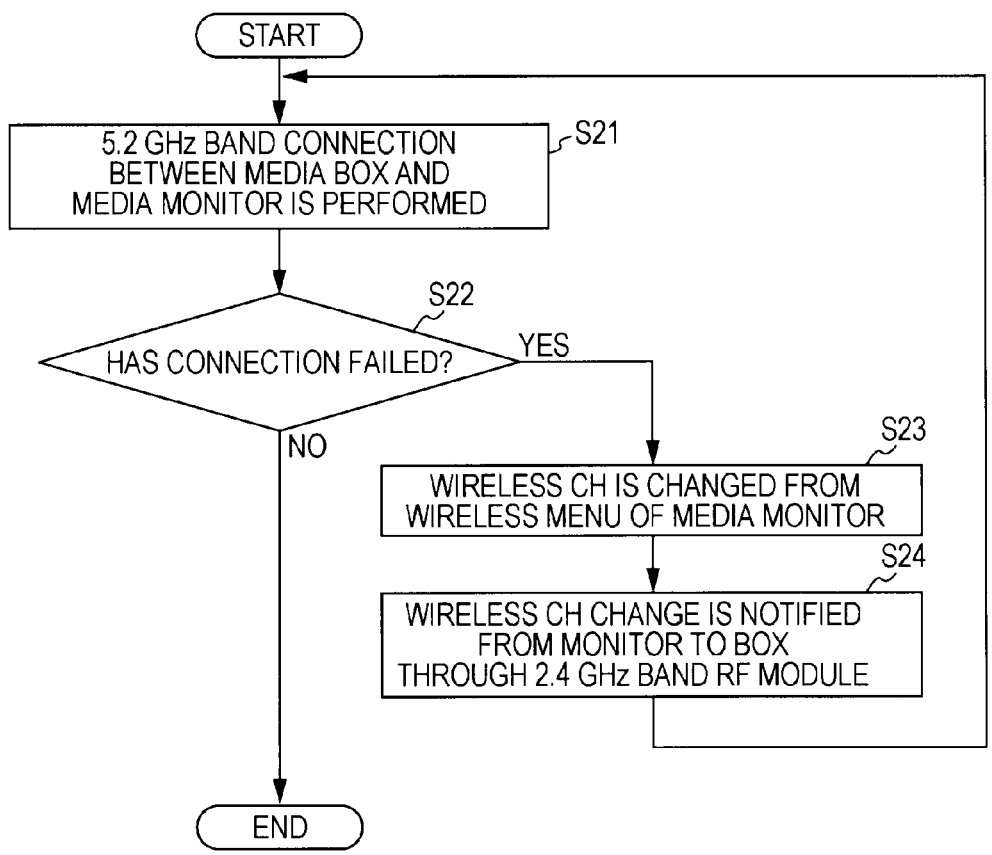
FIG. 7 is a flow chart explaining the connection processing between the media monitor and the media box in the embodiment of the present invention.

Next, processing when the wireless module 103 and the wireless module 203 are connected to each other will be described referring to the flow chart in FIG. 7. In step S21, 5 GHz band connection between the wireless module 203 of the media box 200 and the wireless module 103 of the media monitor 100 is performed. In step S22, it is determined whether or not the connection has failed. If the connection has not failed, the process ends.

When it is determined that the connection has failed in step S22, the radio menu of GUI of the media monitor 100 is opened to change the radio channel in step S23. The operation of the GUI may be performed by either the key of the media box 100 or the key of the commander 120. The change of the radio channel is notified from the transmission module 108 of the media monitor 100 to the receiving module 109 of the media box 200 through the second radio transmission path in which the 2.4 GHz band is used. The radio channel of the wireless module 103 of the media monitor 100 is changed.

The media box 200 to which the change of radio channel has been notified changes the radio channel of the wireless module 203. The process returns to step S21 to perform the 5 GHz band connection between the wireless modules 103 and 203 through the changed radio channel. Then, in step S22, it is determined whether the connection has succeeded or failed. Thus, the process is repeated. As described above, in one embodiment of the present invention, a radio channel which can be communicated with can be searched by using the user interface on the side off the media monitor 100.

In addition, if the exchange of identification information when performing pairing of the wireless modules 103 and 203 is performed through the second radio transmission path in which the 2.4 GHz band is used, it is not necessary to connect the modules to each other with a cable.

Furthermore, in one embodiment of the present invention, power is not supplied to the wireless modules 103 and 203 in a standby state. On the other hand, power is supplied to the receiving module 107 for remote control, the transmission modules 108 and 208 for control signal transmission and reception, and the receiving modules 109 and 209. Accordingly, when the power ON is detected in either the media monitor 100 or the media box 200, it is possible to make the other party turn on by transmitting the information on the power ON to the other party.

Usually, power consumption of the wireless modules 103 and 203 which transmit and receive high-speed data in a 5 GHz band and a high-frequency band is high in normal and standby states. On the other hand, power consumption of the receiving module 107, the transmission modules 108 and 208, and the receiving modules 109 and 209 which perform radio communication in the 2.4 GHz band is low in normal and standby states. Therefore, power consumption in the standby state can be reduced.

The present application contains subject matter related to that disclosed in Japanese Priority Patent Application JP 2008-270495 filed in the Japan Patent Office on Oct. 21, 2008, the entire content of which is hereby incorporated by reference.

The present invention is not limited to the above-described embodiment, and various modifications may be made on the basis of the technical idea of the present invention.

What is claimed is:

1. A display device comprising a monitor including a reception and control device connected to a media box wirelessly and without using a cable, the monitor including:
 a video signal receiving section that wirelessly receives a signal including at least a video component,
 a display section that displays an image based on the received signal including at least a video component from the video signal receiving section,
 an image quality control section that controls image quality of the displayed image of the display section,
 a first control signal transceiver that wirelessly transmits and receives-control signals, and
 a first control section that controls the image quality control section; and the media box including:
 a video signal transmitting section that wirelessly transmits to the video signal receiving section of the monitor said signal including at least said video component via a first radio transmission path formed by and between the video signal transmitting section and the video signal receiving section,
 a second control signal transceiver that wirelessly transmits to and that wirelessly receives from the first control signal transceiver said control signals via a second radio transmission path, different from the first radio transmission path, formed by and between the first and second control signal transceivers,
 a key input section including a plurality of buttons corresponding to respective functions to be controlled by the monitor and the media box, and
 a second control section that controls a user interface displayed on a screen of the display section,
wherein power consumption associated with the first radio transmission path is greater than power consumption associated with the second radio transmission path in a normal state of the display device,
in a standby state of the display device the second radio transmission path is formed and the first radio transmission path is not formed,
wherein the display device is configured such that
upon manual activation of one of the plurality of buttons of the key input section by a user, the media box of the display device determines whether the one of the plurality of buttons of the key input section corresponds to a function to be controlled by the monitor or to be controlled by the media box based on whether a menu is displayed on the screen of the display section,
when the display device determines that the menu is displayed, the display device determines that the manual activation of one of the plurality of buttons of the key input section by the user is to control the user interface displayed on the screen of the display section using the media box,
when the display device determines that the menu is not displayed, a command signal is sent from the second control signal transceiver of the media box to the first control signal transceiver of the monitor, and the monitor determines whether or not the command associated with the command signal is for a monitor side control item, when the monitor determines that the command is for the monitor side control item, the monitor is used to control the display section responsive to the command signal, the key input section of the media box has a cursor moving function of the user interface and a function of changing either a program or volume, the command signal is transmitted through the second radio transmission path, and when the monitor determines that the command signal is not for the monitor side control item, the monitor transmits a command back to the media box, through the second radio transmission path, and the media box treats the command as a channel switching command.

2. The display device according to claim 1, wherein the monitor includes a remote control signal receiving section that receives a remote control signal from a remote control commander, and one of said control signals for control of the user interface is transmitted based on the remote control signal to the second control section of the media box through the second radio transmission path.

3. The display device according to claim 1, wherein the first radio transmission path includes a plurality of communication channels, the user interface is configured to perform an operation of setting a communication channel to be used, and change of a communication channel is provided from the monitor to the media box through the second radio transmission path.

4. The display device according to claim 1, wherein, when identifiers are exchanged between the video signal transmitting section and the video signal receiving section in order to form the first radio transmission path, the identifiers are exchanged through the second radio transmission path.

5. A radio transmission control method, comprising: providing a user interface, operative based on an application program executing in a media box, and which uses a screen display of a display device provided in a monitor including a reception and control device, the media box being connectable wirelessly to the monitor, without using a cable, through a first radio transmission path between respective first portions of the media box and the monitor and a second radio transmission path, different from the first radio transmission path, between respective second portions of the media box and the monitor;

transmitting wirelessly a signal including at least a video component from the first portion of the media box to the first portion of the monitor through the first radio transmission path;

transmitting wirelessly a control signal, which is generated based on a user input of a key input section of the media box, the key input section of the media box including a plurality of buttons corresponding to respective functions to be controlled by the monitor and the media box, and a subsequent determination, upon manual activation of one of the plurality of buttons of the key input section by a user, by the media box as to whether the one of the plurality of buttons of the key input section corresponds to a function to be controlled by the monitor or to be controlled by the media box based on whether or not a menu is displayed on the user interface, to the second portion of the monitor through the second radio transmission path to perform an operation of the user interface; and wirelessly receiving at the monitor another control signal from a remote control device via a third radio transmission path, different from the first and second radio transmission paths, between a third portion of the monitor, different from the first and second portions of the monitor, and the remote control device, wherein power consumption associated with the first radio transmission path is greater than power consumption associated with the second radio transmission path during normal operation of the radio transmission control method, during standby operation of the radio transmission control method, the second radio transmission path between respective second portions of the media box and the monitor is formed and the first radio transmission path between respective first portions of the media box and the monitor is not formed, the key input section of the media box has a cursor moving function of the user interface and a function of changing either a program or volume, when the one of the plurality of buttons of the key input section is pressed, information regarding the pressed one of the plurality of buttons is transmitted between the respective second portions of the monitor and the media box through the second radio transmission path so that the function of the pressed one of the plurality of buttons is determined, and another signal based on the another control signal from the remote control device is transmitted from the second portion of the monitor to the second portion of the media box via the second radio transmission path to control the user interface.

6. The radio transmission control method according to claim 5, wherein the first radio transmission path includes a plurality of communication channels, the user interface performs an operation of setting a communication channel to be used, and change of a communication channel is provided from the second portion of the monitor to the second portion of the media box through the second radio transmission path.

7. The radio transmission control method according to claim 5, wherein, when identifiers are exchanged to form the first radio transmission path, the identifiers are exchanged between the second portion of the monitor and the second portion of the media box through the second radio transmission path.

8. The display device according to claim 1, wherein power is not supplied to the video signal receiving section in the standby state of the display device.

9. The display device according to claim 1, wherein the user interface is a graphical user interface, an application program for the graphical user interface resides in the media box, and the first and second radio transmission paths are directly between the monitor and the media box.

10. The display device according to claim 1, wherein the monitor includes a remote control signal receiving section to wirelessly receive a remote control signal directly from a control source external to the display device, and a control signal based on the remote control signal is transmitted from the monitor to the media box via the second radio transmission path as one of said control signals to control the user interface.

11. The display device according to claim 1,
wherein power consumption associated with the first radio transmission path is greater than power consumption associated with the second radio transmission path in the normal state of the display device and in a standby state of the display device.

12. The display device according to claim 1,
wherein the monitor determines whether the command is for a media box side control item.

13. The radio transmission control method according to claim 5, further comprising determining whether a received control signal relates to a monitor side of the display device or to a media box side of the display device in response to the subsequent determination as to whether or not the menu is displayed indicating that the menu is not displayed.

14. A display device comprising:
a video signal receiving section that wirelessly receives, without a cable, via a first wireless transmission path between the video signal receiving section and a video signal transmitting section external to the display device, a signal including at least a video component;
a display section that displays an image based on the received signal including at least a video component from the video signal receiving section;
an image quality control section that controls image quality of the displayed image of the display section;
a first control signal transceiver that wirelessly transmits and receives, without a cable, control signals via a second wireless communication path, different from the first wireless communication path, between the first control signal transceiver and a second control signal receiver external to the display device, the first control signal transceiver being configured to transmit a control signal generated based on a user input of a key input section of the external second control signal receiver, the key input section including a plurality of buttons corresponding to respective functions to be controlled by the first control signal transceiver and the external second control signal receiver, and a subsequent determination, upon manual activation of one of the plurality of buttons of the key input section by a user, by the external second control signal receiver as to whether the one of the plurality of buttons of the key input section corresponds to a function to be controlled by the first control signal transceiver or to be controlled by the external second control signal receiver based on whether or not a menu is displayed on a user interface displayed on the display section, to the external second control signal receiver through the second wireless communication path;
a control signal receiver that wirelessly receives control signals via a third wireless communication path, different from the first and second wireless communication paths, between the control signal receiver and a remote control device external to the display device; and
a control section that controls the image quality control section, wherein
the display device determines whether a received control signal from either of the second or third wireless communication paths relates to an external media box or to a monitor including a reception and control device associated with the display device, which includes the video signal receiving section, the display section, the image quality control section, the control signal transceiver, the control signal receiver, and the control section,
when it is determined that the received control signal relates to the external media box, a control signal is transmitted from the second control signal transceiver for transmission over the second wireless communication path,
when it is determined that the received control signal relates to the monitor, a control signal is provided for control of the monitor and not transmitted over the second wireless communication path,
the display device is operative such that during standby operation the second wireless communication path is formed and the first radio wireless communication path is not formed,
the key input section has a cursor moving function of the user interface and a function of changing either a program or volume, and
when the one of the plurality of buttons of the key input section is pressed, information regarding the pressed one of the plurality of buttons is transmitted between respective portions of the monitor and the external media box through the second radio transmission path so that the function of the pressed one of the plurality of buttons is determined.

15. The display device according to claim 14,
wherein the control signal receiver receives wirelessly a signal from the remote control device external to the display device.

16. The display device according to claim 14,
wherein the first and second wireless communication paths are formed directly between the external second control signal receiver of the external media box and the display device.

17. The display device according to claim 14,
wherein, when identifiers are exchanged to form the first wireless communication path, the identifiers are exchanged through the second wireless communication path.

18. The display device according to claim 1, wherein said video component is transmitted without compression via said first radio transmission path from the video signal transmitting section of the media box to the video signal receiving section of the monitor.

* * * * *